United States Patent
Kim et al.

(10) Patent No.: US 7,580,366 B2
(45) Date of Patent: Aug. 25, 2009

(54) METHOD AND APPARATUS FOR DETERMINING REVERSE DATA RATE IN MOBILE COMMUNICATION SYSTEM

(75) Inventors: Dae-Gyun Kim, Seoul (KR); Ho-Kyu Choi, Seoul (KR); Jin-Soo Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 428 days.

(21) Appl. No.: 11/366,876

(22) Filed: Mar. 2, 2006

(65) Prior Publication Data

US 2006/0146876 A1    Jul. 6, 2006

Related U.S. Application Data

(63) Continuation of application No. 09/899,628, filed on Jul. 5, 2001, now Pat. No. 7,054,275.

(30) Foreign Application Priority Data

Apr. 7, 2000 (KR) .............................. 2000-38085

(51) Int. Cl.
 *H04J 1/16* (2006.01)
 *H04J 3/16* (2006.01)
(52) U.S. Cl. ...................... 370/252; 370/465
(58) Field of Classification Search ................. 370/252, 370/465
 See application file for complete search history.

(56) References Cited

U.S. PATENT DOCUMENTS

| | | | |
|---|---|---|---|
| 5,914,950 A | 6/1999 | Tiedemann et al. | |
| 6,111,863 A | 8/2000 | Rostoker et al. | |
| 6,317,600 B1 | 11/2001 | Salonaho et al. | |
| 6,339,697 B1 | 1/2002 | Ranta | |
| 6,356,531 B1 | 3/2002 | Soliman | |
| 6,393,276 B1 | 5/2002 | Vanghi | |
| 6,584,302 B1 | 6/2003 | Hottinen et al. | |
| 6,591,110 B1 | 7/2003 | Kim et al. | |
| 6,594,495 B2 | 7/2003 | Salonaho et al. | |
| 6,597,705 B1 * | 7/2003 | Rezaiifar et al. | 370/468 |
| 6,628,633 B1 * | 9/2003 | Mochizuki | 370/335 |
| 6,628,956 B2 * | 9/2003 | Bark et al. | 455/522 |
| 6,671,512 B2 | 12/2003 | Laakso | |
| 6,760,567 B1 * | 7/2004 | Jeong et al. | 455/67.11 |
| 6,788,943 B1 | 9/2004 | Hamalainen et al. | |
| 6,788,952 B1 | 9/2004 | Jokimies et al. | |
| 6,973,062 B1 * | 12/2005 | Han | 370/335 |

* cited by examiner

*Primary Examiner*—Andrew Lee
(74) *Attorney, Agent, or Firm*—The Farrell Law Firm, LLP

(57) ABSTRACT

A reverse data rate determining method in a mobile communication system for high data rate transmission such as an HDR system, wherein an AN (Access Network) within a cell calculates a total load of a reverse link by measuring a total energy of a reverse link from ATs (Access Terminals) within the cell. The AN calculates the share of each AT in the total reverse link load. If the load share of an AT is greater than a threshold predetermined individually for the AT, the AN determines that the AT should reduce its data rate.

3 Claims, 6 Drawing Sheets

METHOD AND APPARATUS FOR DETERMINING REVERSE DATA RATE IN MOBILE COMMUNICATION SYSTEM

PRIORITY

This application is a Continuation of U.S. application Ser. No. 09/899,628, which was filed on Jul. 5, 2001 now U.S. Pat. No. 7,054,275 and claims priority to an application entitled "Apparatus and Method for Transmitting MAC Channel in Mobile Communication System for High Data Rate Transmission" filed in the Korean Industrial Property Office on Jul. 4, 2000 and assigned Serial No. 2000-38085, the contents of both of which are hereby incorporated by reference.

BACKGROUND OF THE INVENTION

1. Field of the Invention

The present invention relates generally to a mobile communication system employing a high data rate transmission scheme, and in particular, to a method and an apparatus for determining a reverse data rate.

2. Description of the Related Art

Many studies have recently been made on high data rate transmission in a CDMA (Code Division Multiple Access) mobile communication system. A major mobile communication system employing a channel structure for high data rate transmission is the HDR (High Data Rate) system. The HDR system was proposed by the 3GPP2 (3rd Generation Partnership Project 2) organization to reinforce data communication of the IS-2000 system.

A pilot channel, a forward MAC (Medium Access Control) channel, a forward traffic channel, and a forward control channel are transmitted in time division multiplexing (TDM) on a forward link in the HDR system. The set of TDM signals is called a burst. The forward traffic channel transmits user data, and the forward control channel transmits a control message and user data. The forward MAC channel transmits reverse data rate control information, reverse power control information, and information indicating whether forward data transmission will occur or not.

Unlike the forward channels, reverse channels in the HDR system are assigned to specific ATs (Access Terminals). Reverse channels for each AT include a pilot channel, a reverse traffic channel, a reverse MAC channel, and an access channel. The reverse traffic channel transmits user data, and the reverse MAC channel includes a DRC (Data Rate Control) channel and an RRI (Reverse Rate Indicator) channel. The reverse access channel is used to transmit a message or traffic to an AN (Access Network) before connection of a traffic channel.

A data rate control scheme and related channels in a mobile communication system for data transmission such as an HDR system to which the present invention will be applied, will now be described.

To control a forward data rate, each AT transmits DRC information in predetermined slots to an AN. The AN transmits data at a controlled data rate only to an AT in a good channel condition. This HDR transmission scheme remarkably increases the volume of forward link data that can be processed. With the transmission power at a maximum, the AN transmits more data per unit time during good channel conditions, and less data per unit time during poor channel conditions, by changing the length. The AN transmits data to only one AT within the AN on a transmission channel for a predetermined time period. The DRC information provides an available forward data rate calculated based on an estimated channel state in the AT.

Unlike the forward link, the reverse link allows each AT to transmit traffic at a given data rate. Here, a maximum data rate and an overload control scheme are also given. The AN notifies the AT of a maximum available reverse data rate through use of a ReverseRateLimit (RRL) message, and overload control information through use of an RAB (Reverse Activity Bit) on a MAC channel, both of which are transmitted in a forward slot.

The RAB is used to control a reverse data rate and thus control reverse link overload. For example, if the RAB is 0, the AT can either double its reverse data rate or allow it to remain at its present rate. If the RAB is 1 on the AT transmits data at or above 19.2 kbps, the AT reduces its reverse data rate by one half transmits data at or above 19.2 kbps.

FIG. 1 is a block diagram of a forward channel transmitter in a conventional mobile communication system employing a high data rate transmission scheme.

Referring to FIG. 1, the forward channel transmitter in an AN transmits a traffic channel, a preamble, a MAC channel, and a pilot channel to an AT.

After encoded in an encoder (not shown), modulated in a modulator (not shown), and interleaved in an interleaver (not shown), the traffic channel signal is punctured and repeated according to a data rate in a symbol puncturer & block repeater 101. A demultiplexer (DEMUX) 102 demultiplexes the output of the symbol puncturer & block repeater 101. For example, the DEMUX 102 converts 16 successive bits as 16 parallel channel signals. A Walsh spreader 103 spreads each of the 16 channel signals by 16 Walsh codes and a channel gain controller 104 controls the gains of the spread signals. A Walsh chip level summer 105 sums the outputs of the channel gain controller 104 at a chip level.

The preamble is repeated in accordance with the data rate in a repeater 106. A signal mapper 107 maps 0s and 1s of the output of the repeater 106 to +1s and −1s, respectively. A Walsh spreader 108 spreads the output of the signal mapper 107 with a predetermined Walsh code. A first time division multiplexer (TDM) 109 time-division-multiplexes the traffic channel signal received from the Walsh chip level summer 105 and the preamble signal received from the Walsh spreader 108 according to a TDM control signal. Referring to the pilot channel, 0s and 1s of the pilot channel signal are mapped to +1s and −1s, respectively, in a signal mapper 191. A multiplier 192 multiplies the output of the signal mapper 191 by a predetermined Walsh code and outputs a spread pilot channel signal.

The forward MAC channel transmits an FAB (Forward Activity Bit), an RPC (Reverse Power Control), and an RAB. When the FAB is generated in every frame (e.g., 26.67 ms), a bit repeater 110 repeats the FAB 15 times (the FAB occurs 16 times) to increase a search probability. For the input of the repeated FAB symbols, a signal mapper 130 generates a signal of ±1 in a real transmission form. A multiplier 150 multiplies the output of the signal mapper 130 by a Walsh code. The Walsh code is Walsh code #1 among Walsh codes of length 32 bits.

No power control is performed on the forward link of a mobile communication system like the HDR system because it transmits signals with its maximum transmission power. However, a soft handover and a power control are required on the reverse link. Therefore, an AN transmits the RPC bit as reverse power control information. The RPC bit is generated at 600 bps. A signal mapper 131 converts the RPC bit to a signal of ±1 in a real transmission form. A Walsh channel gain controller 140 multiplies the output of the signal mapper 131 by a Walsh channel gain function. The gain function applied to an RPC bit for each AT is determined according to a DRC received from the AT. For example, if a link state is very poor, the gain controller 140 determines a gain to be 0 and transmits no power control information. A multiplier 151 multiplies the output of the Walsh channel gain controller 140 by a Walsh code of length 32 corresponding to the MAC index of a corresponding AT.

A bit repeater 120 repeats the RAB according to RABLength. The transmission rate of the RAB is 600/RABLength bps and RABLength is known by a channel assignment message. A signal mapper 132 converts the RAB to a signal of ±1 in a real transmission form and a multiplier 152 multiplies the output of the signal mapper 132 by Walsh code #2 of length 32.

A Walsh chip level summer 160 sums the FAB, RPC, and RAB signals. A signal repeater 170 repeats the sum three times (the sum occurs four times) and multiplexes the repeated sum in the second half of a forward transmission slot prior to transmission to the AT. A second TDM 180 time-division-multiplexes the traffic signal received from the first TDM 105, the pilot signal received from the multiplier 192, and the output of the repeater 170.

FIG. 2A illustrates the structure of an active slot in the conventional mobile communication system employing a high data rate transmission scheme. The active slot is transmitted only when there exists traffic or control data to be transmitted on a forward channel.

Referring to FIG. 2A, a pilot channel, a MAC channel, and traffic or control data are time-division-multiplexed in the active slot. The pilot channel is used for channel estimation in a receiver. The pilot channel data can be modulated in BPSK (Bi-Phase Shift Keying). The pilot channel includes two pilot bursts per slot and each pilot burst is disposed at the center of a half slot.

The MAC channel includes an FAB, an RPC, and an RAB. Each of the three channels is modulated in BPSK and spread with a Walsh code of length 32. Since each of the channels of the MAC channel is spread to 32 chips and occurs four times, a total of 128 chips are assigned to the MAC channel in one slot. The 128-chip MAC channel is divided into two equal 64-bit bursts. The two bursts are located in TDM before and after the second pilot burst. A traffic varies depending on channel conditions. That is, the traffic can be transmitted at a variable data rate according to the reception carrier-to-interference ratio (C/I) of a receiver and the number of slots for one can be changed according to a data rate.

FIG. 2B illustrates the structure of an idle slot in the conventional mobile communication system employing a high data rate transmission scheme. The idle slot is transmitted when there is neither traffic nor control data to be transmitted on the forward channel.

Referring to FIG. 2B, in the absence of forward traffic or forward control data to be transmitted, only a pilot channel and a MAC channel are transmitted in an idle slot (or an idle frame). Each idle skirt signal of all 0s is inserted before and after a first pilot burst. The idle skirt signal is transmitted to increase an accuracy with which a reception C/I is estimated when a multi-path component of the pilot channel arrives in the AT at a different time from that of a pilot signal from another AN.

Only the pilot channel signal is transmitted in a first half of the idle slot, and the pilot channel signal and MAC channel data before and after the pilot channel signal are transmitted in a second half slot. Because the arrival time of the multi-path component of the first pilot burst differs from that of a pilot burst from another AN, the pilot bursts are at different positions on a time axis and thus interference with the first pilot burst may be measured to be lower than in reality. On the other hand, despite the difference between the arrival times of a multi-path component of the second pilot burst and the pilot burst from the different AN on the time axis, the C/I is estimated accurately due to the MAC channel in the second half slot. Accordingly, the idle skirt signals are located before and after the first pilot burst in order to increase the accuracy of estimating the C/I of the first pilot burst. The idle skirt signals are two 64-chip bursts like the MAC channel.

Now, the FAB, RPC, and RAB of the forward MAC channel will be described in detail. The FAB indicates whether a forward traffic channel and a forward control channel are activated or not on a frame by frame basis. The same FAB is transmitted in 16 slots to an AT. An FAB in an nth frame indicates whether a forward channel in an (n+2) frame is activated or not. According to the FAB, the AT can detect an AN without data transmission while estimating a C/I to generate a DRC signal. Thus, the AT can set a DRC value accurately. If the FAB is 0, it implies that there is no data to be transmitted in the (n+2) frame and if the FAB is 1, it implies that there is data to be transmitted in the (n+2) frame.

The RPC is power control information needed for reverse power control. However, no power control is required on the forward link because the maximum transmission power is used all the time.

The RAB is identical for all ATs, for control of data rates. If an RAB from at least one AN in an active set for one frame period is 1, ATs that are transmitting at or above 19.2 kbps should reduce their reverse data rates by half. If RABs from all ANs in the active set are 0s, ATs should keep their current data rates or double them. While the RAB control is advantageous in that overload is controlled by uniform control of the data rates of unspecified ATs, it may result in unnecessary data rate reduction. The indiscriminate data rate control is not appropriate when a threshold is set for RAB application and the reverse data rate of each AT is controlled according to the threshold while maintaining the reverse link capacity in the vicinity of the threshold within a controllable range of an AN.

SUMMARY OF THE INVENTION

It is, therefore, an object of the present invention to provide a method and an apparatus for efficiently controlling overload by transmitting an RAB on a forward MAC channel to an individual AT for improved control of a reverse data rate in a mobile communication system like an HDR system.

It is another object an object of the present invention to provide a method and an apparatus for locating a forward MAC channel separately in the first and second half slots for efficient transmission of the forward MAC channel in a mobile communication system like an HDR system.

The foregoing and other objects of the present invention are achieved by providing a reverse data rate determining method in a mobile communication system for high data rate transmission such as an HDR system. According to one aspect of the present invention, an AN within a cell calculates the total load of a reverse link by measuring the total energy of the reverse link from ATs within the cell. The AN calculates the share of each AT in the total reverse link load. If the load share of an AT is greater than a predetermined threshold, individually selected for the AT, the AN determines that the AT should reduce its data rate.

According to another aspect of the present invention, an AN within a cell calculates the total load of a reverse link by measuring the total energy of the reverse link from ATs within the cell. The AN calculates the share of each AT in the total reverse link load. If the load share of an AT is greater than a predetermined threshold for the ATs, the AN determines that the AT should reduce its data rate.

According to a further aspect of the present invention, an AN in a cell calculates the total load of a reverse link by measuring the total energy of the reverse link from ATs within the cell. The AN calculates the share of each AT in the total reverse link load. The AN compares the load share of each AT with a predetermined threshold for the AT, and determines that the AT should increase or reduce the data rate of data that the AT transmits according to the comparison result. The AN compares the reverse link capacity calculated according to the determined reverse data rates with the total reverse capacity of the AN and controls the thresholds according to the comparison result.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 3:
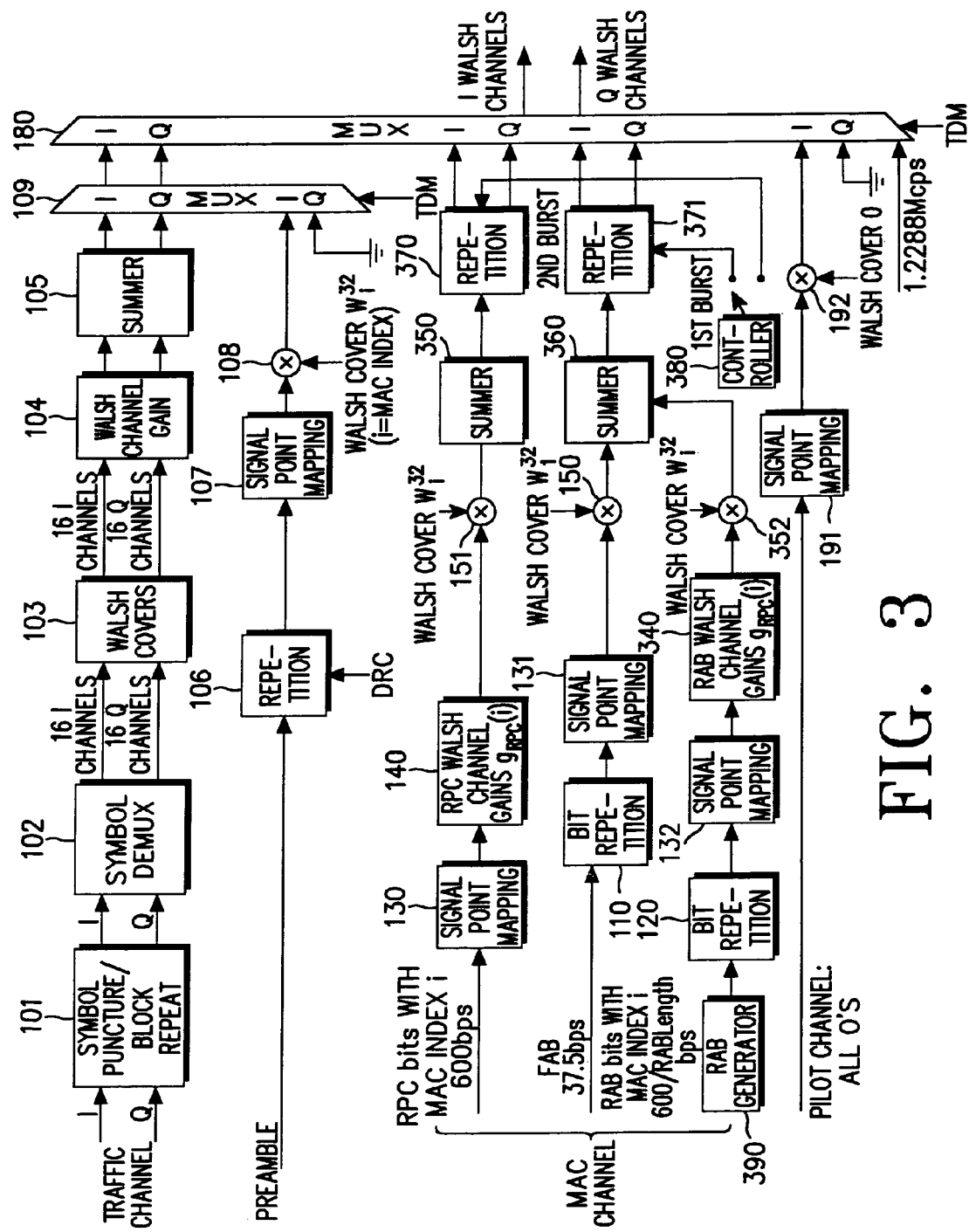
FIG. 3 is a block diagram of a forward channel transmitter according to an embodiment of the present invention.

FIG. 3 is a block diagram of a forward channel transmitter that assigns RABs individually to ATs on a MAC channel for efficient control of data rates and overload on the reverse link in a mobile communication system like an HDR system according to an embodiment of the present invention. In the following description, Walsh codes are used to spread transmission signals, but other orthogonal codes can be substituted to provide the orthogonal spreading.

Referring to FIG. 3, the forward channel transmitter in an AN transmits a traffic channel, a preamble, a MAC channel, and a pilot channel to an AT.

After encoded in an encoder (not shown), modulated in a modulator (not shown), and interleaved in an interleaver (not shown), the traffic channel signal is punctured and repeated according to a data rate in the symbol puncturer & block repeater 101. The DEMUX 102 demultiplexes the output of the symbol puncturer & block repeater 101. For example, the DEMUX 102 transmits 16 successive bits as 16 parallel channel signals. The Walsh spreader 103 spreads each of the 16 channel signals by 16 Walsh codes and the channel gain controller 104 controls the gains of the spread signals. The Walsh chip level summer 105 sums the outputs of the channel gain controller 104 at a chip level.

The preamble is repeated in accordance with the data rate in the repeater 106. The signal mapper 107 maps 0s and 1s of the output of the repeater 106 to +1s and −1s, respectively. The Walsh spreader 108 spreads the output of the signal mapper 107 with a predetermined Walsh code. The first TDM 109 time-division-multiplexes the traffic channel signal received from the Walsh chip level summer 105 and the preamble signal received from the Walsh spreader 108 according to a TDM control signal. Referring to the pilot channel, 0s and 1s of the pilot channel signal are mapped to +1s and −1s in the signal mapper 191. The multiplier 192 multiplies the output of the signal mapper 191 by a predetermined Walsh code and outputs a spread pilot channel signal.

Figure 1:
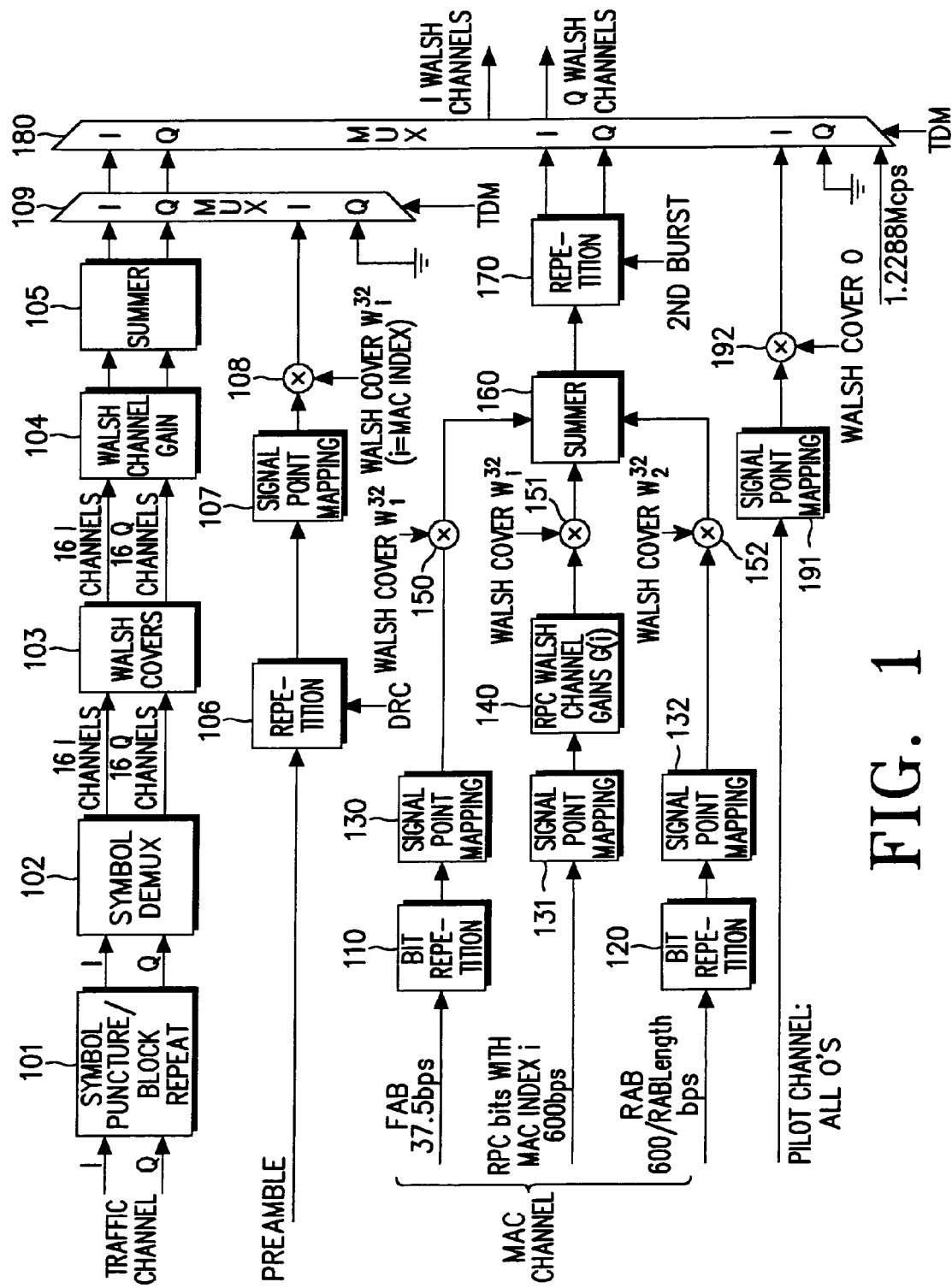
FIG. 1 is a block diagram of a forward channel transmitter in a conventional mobile communication system for high data rate transmission.

According to a feature of the present invention, a forward MAC channel transmitter will be described. The conventional forward MAC channel transmitter shown in FIG. 1 is so configured that it transmits the same RAB to all ATs indiscriminately. The RAB is spread with Walsh code #2 of length 32 such that it can be identified by any AT.

The forward MAC channel transmitter according to the present invention, however, multiplies an RAB by different Walsh codes according to MAC indexes in a multiplier 352 in order to transmit different RABs to individual ATs. Then, an AT can identify a signal destined for it by its own MAC index. In connection to an HDR service session, the AN assigns a UATI (Unicast Access Terminal Identifier) of 32 bits. The AN also assigns a MAC index to an AT that enters the service area of each sector. Each MAC index is assigned 5 bits, included in a channel assignment message transmitted for assignment of a dedicated channel. Since a different Walsh code is assigned to each MAC index, an AT can detect only its own information by the MAC index. RAB processing is similar to modulation/demodulation of an RPC for control of reverse transmission power for an individual AT.

In FIG. 3, an RPC and an FAB/RAB are transmitted in different half slots. The RPC is converted to a signal of ±1 in a real transmission form by the signal mapper 131. The Walsh channel gain controller 140 multiplies the output of the signal mapper 131 by a gain for a corresponding AT. The gain is determined according to a DRC received from the AT. The multiplier 151 multiplies the output of the Walsh channel gain controller 140 by a Walsh code for the AT, for spreading. A Walsh chip summer 350 sums RPCs for ATs received from the multiplier 151. A signal repeater 370 repeats the output of the Walsh chip summer 350 predetermined times (e.g., three times) and outputs the repeated symbols such that the RPC signal is inserted before and after the second pilot burst. The operation of the signal repeater 370 is controlled according to a slot division control signal received from a controller 380. The second TDM 180 time-division-multiplexes the RPC signals received from the repeater 370 with other signals (the pilot channel signal and the traffic channel data).

An RAB is generated by an RAB generator 390. The RAB generator 390 performs an operation of determining and generating an RAB for each AT, which is illustrated in the following FIG. 6. It is noted that the detailed operation of the RAB generator 390 will be described with reference to FIG. 6. The bit repeater 120 repeats the RAB according to RABLength. The signal mapper 132 converts the RAB to a signal of ±1 in a real transmission form and a channel gain controller 340 multiplies the RAB signal received from the signal mapper 132 by a gain for the AT. A multiplier 352 multiplies the output of the gain controller 340 by a Walsh code for the AT, for spreading.

An FAB is repeated by the bit repeater 110. For the input of the repeated FAB signal, the signal mapper 130 generates a signal of ±1 in a real transmission form. The multiplier 150 multiplies the output of the signal mapper 132 by Walsh code #1 of length 32.

A Walsh chip level summer 360 sums the FAB signal received from the multiplier 150 and the RAB signals for the ATs received from the multiplier 352. A signal repeater 371 repeats the sum predetermined times (e.g., three times) so that the RAB/FAB signal is inserted before and after the first pilot burst in the first half slot. The operation of the signal repeater 371 is controlled according to a slot division control signal received from the controller 380. The RAB/FAB signals are multiplexed with other signals (the pilot channel signal and the traffic channel data) by the second TDM 180.

As stated above, the signal repeaters 370 and 371 operate according to the slot division control signals received from the controller 380. In other words, the controller 380 generates the slot division control signal so that the signal repeater 370 operates in the second half slot and the signal repeater 371 operates in the first half slot.

Figure 4A:
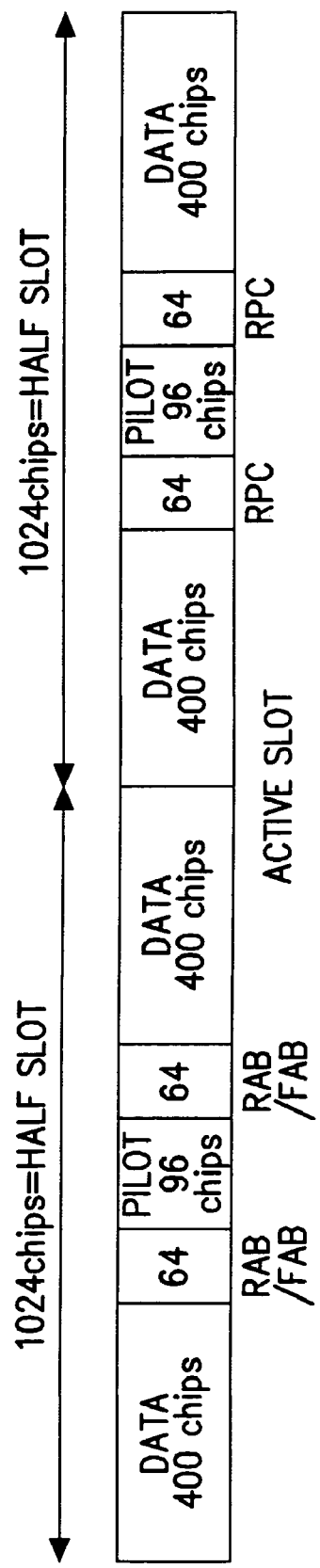
FIG. 4A illustrates the structure of a forward active slot according to the embodiment of the present invention.
Figure 4B:
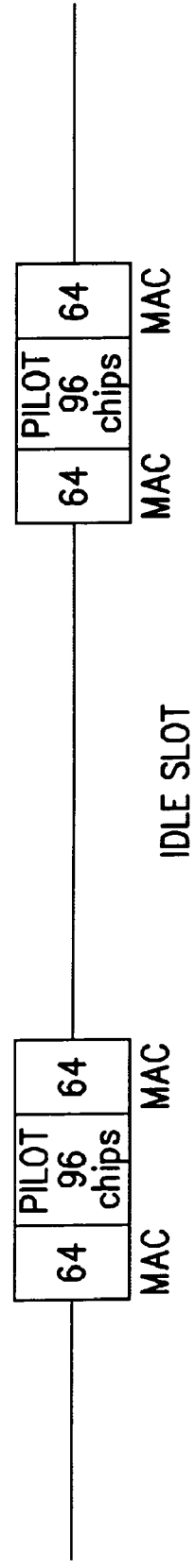
FIG. 4B illustrates the structure of a forward idle slot according to the embodiment of the present invention.

In the case of an active slot, the second TDM 180 generates a slot as shown in FIG. 4A with the traffic channel data, the pilot channel signal, the RAB/FAB, and the RPC according to a TDM control signal from the controller 380. In the case of an idle slot, the second TDM 180 generates a slot as shown in FIG. 4B with the pilot channel signal, the RAB/FAB, and the RPC according to the TDM control signal from the controller 380. Since the RAB/FAB and the RPC are output from the repeaters 370 and 371 in accordance with timing shown in FIG. 4A or 4B, the second TDM 180 merely multiplexes the RAB/FAB and the RPC to be inserted before and after the pilot bursts.

FIG. 4A illustrates the structure of an active slot according to the embodiment of the present invention. An FAB and an RAB for an individual AT are transmitted in the first half slot and an RPC for the individual AT in the second half slot. The forward MAC channel is transmitted before and after each pilot burst separately in the first and second half slots.

The conventional forward channel transmitter shown in FIG. 1 transmits the sum of a FAB, an RAB, and an RPC in the second half of a forward transmission slot. However, since RABs are spread with 32 Walsh codes with the MAC indexes of ATs used as the IDs of the ATs in the present invention, transmission of an RAB with the RPC in the second half slot will make it impossible to discriminate between the RAB and the RPC. Therefore, the RAB is transmitted in the first half slot and the RPC in the second half slot.

In the case where the same power is consumed, it makes no difference whether the FAB is located in the first half slot or in the second half slot. The RAB can be transmitted with a less error rate because it occurs repeatedly in 8 to 24 slots, whereas the same RPC occurs once in one slot and thus with a higher error rate. Therefore, the FAB is transmitted with the RAB in the first half slot in the embodiment of the present invention.

FIG. 4B illustrates the structure of an idle slot according to the embodiment of the present invention. The FAB/RAB of the forward MAC channel is transmitted separately in the first half slot.

Figure 2A:
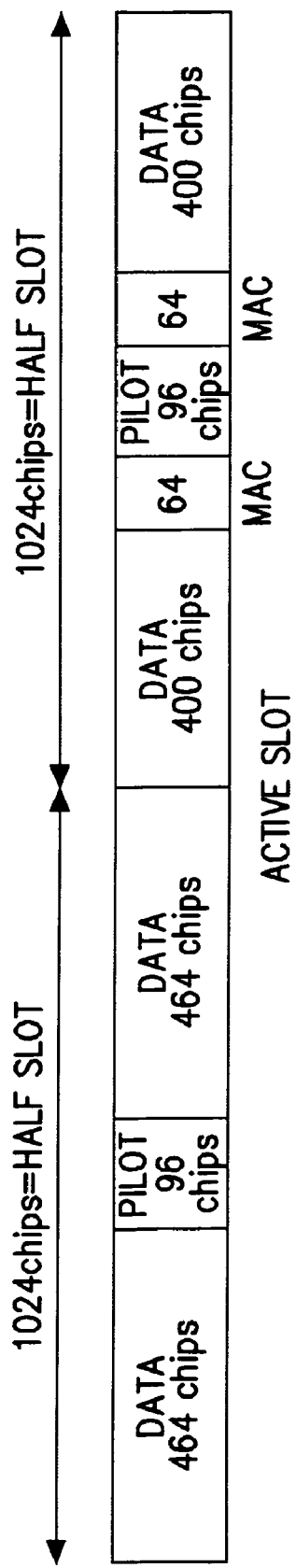
FIG. 2A illustrates the structure of a forward active slot in the conventional mobile communication system for high data rate transmission.
Figure 2B:
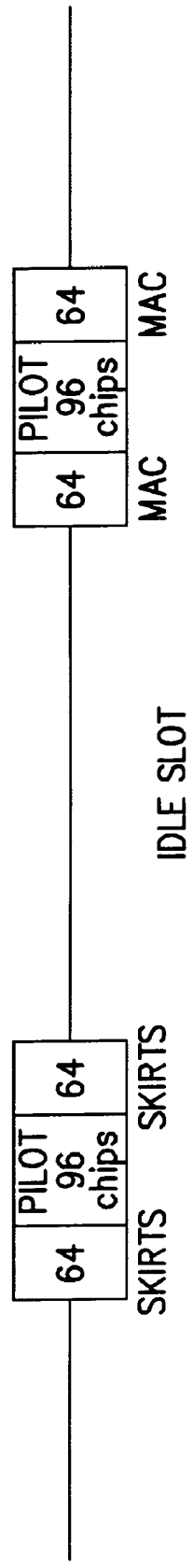
FIG. 2B illustrates the structure of a forward idle slot in the conventional mobile communication system for high data rate transmission.

Referring to FIG. 4B, MAC channel signals are transmitted instead of the idle skirt signals in the conventional idle slot shown in FIG. 2B. The RAB/FAB signal and the RPC signal, that are spread with Walsh codes of length 32 and repeated three times, are transmitted in the two skirt bursts of the first half slot. As stated before, the FAB is spread with Walsh code #1 of length 32, while the RAB and RPC are multiplied by a corresponding MAC index other than Walsh codes #0 and #1. The FAB, the RPC, and the RAB are summed at a chip level before transmission as MAC channel data. Regardless of an active slot or an idle slot, the MAC channel data is transmitted by 64 chips before and after the pilot burst in both the first and second half slots. The RAB/FAB is before and after the pilot burst in the first half slot and the RPC is before and after the pilot burst in the second half slot.

Figure 5:
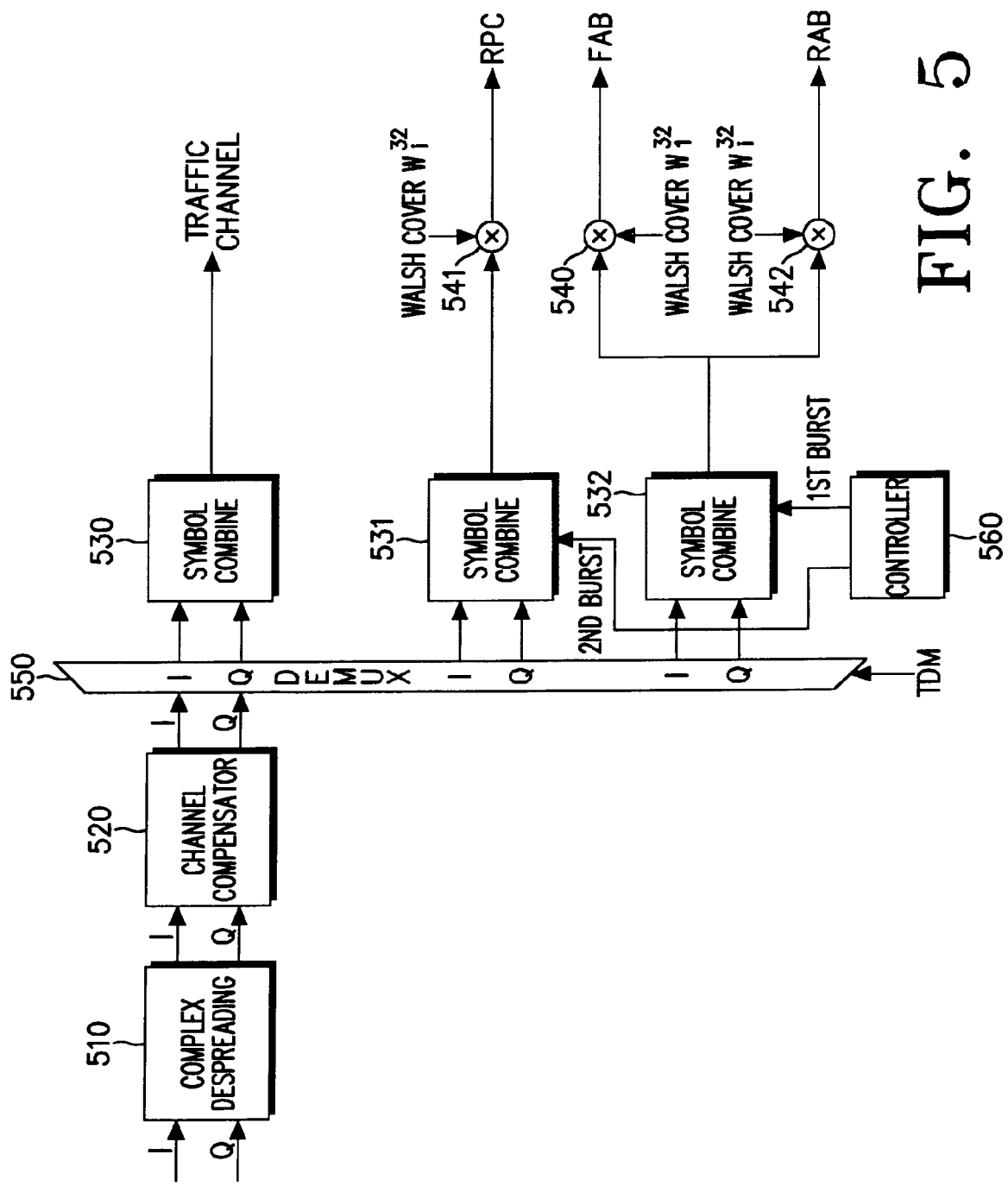
FIG. 5 is a block diagram of a MAC channel receiver according to the embodiment of the present invention.

FIG. 5 is a block diagram of a receiver in an AT for receiving a forward MAC channel according to the embodiment of the present invention. Referring to FIG. 5, a complex despreader 510 complex-despreads a received signal and a channel compensator 520 channel-compensates the despread signal. A DEMUX 550 demultiplexes the channel-compensated signal into traffic data and MAC channel data in the reverse order of TDM in the TDM 180 of the forward channel transmitter according to a TDM signal received from a controller 560.

A symbol combiner 530 combines the traffic symbols of the DEMUX 550 and outputs the combined traffic signal as traffic channel data. A symbol combiner 531 adds repeated symbol energy to the MAC channel data in the second half slot and a multiplier 541 multiplies the resulting MAC channel data by a Walsh code corresponding to the MAC index of the user. Thus, an RPC for the AT is separately detected.

A symbol combiner 532 adds repeated symbol energy to the MAC channel data in the first half slot and multipliers 540 and 542 multiply the resulting MAC channel data by Walsh code #1 and the Walsh code corresponding to the MAC index of the user, respectively. Thus, an FAB and an RAB for the AT are separately detected.

More specifically, a 128-chip MAC channel signal in each half slot is accumulated by 32 chips, four times, in a symbol combiner, and thus a 32-chip MAC signal is generated. The multiplier 540 recovers the FAB by multiplying the 32-chip MAC signal received from the symbol combiner 532 by Walsh code #1 of length 32 and the multiplier 542 recovers the RAB by multiplying the 32-chip MAC signal received from the symbol combiner 532 by the MAC index. The multiplier 541 recovers the RPC by multiplying the 32-chip MAC signal received from the symbol combiner 531 by the MAC index. The multipliers 540, 541, and 542 act as despreaders for outputting despread MAC channel signals.

Figure 6:
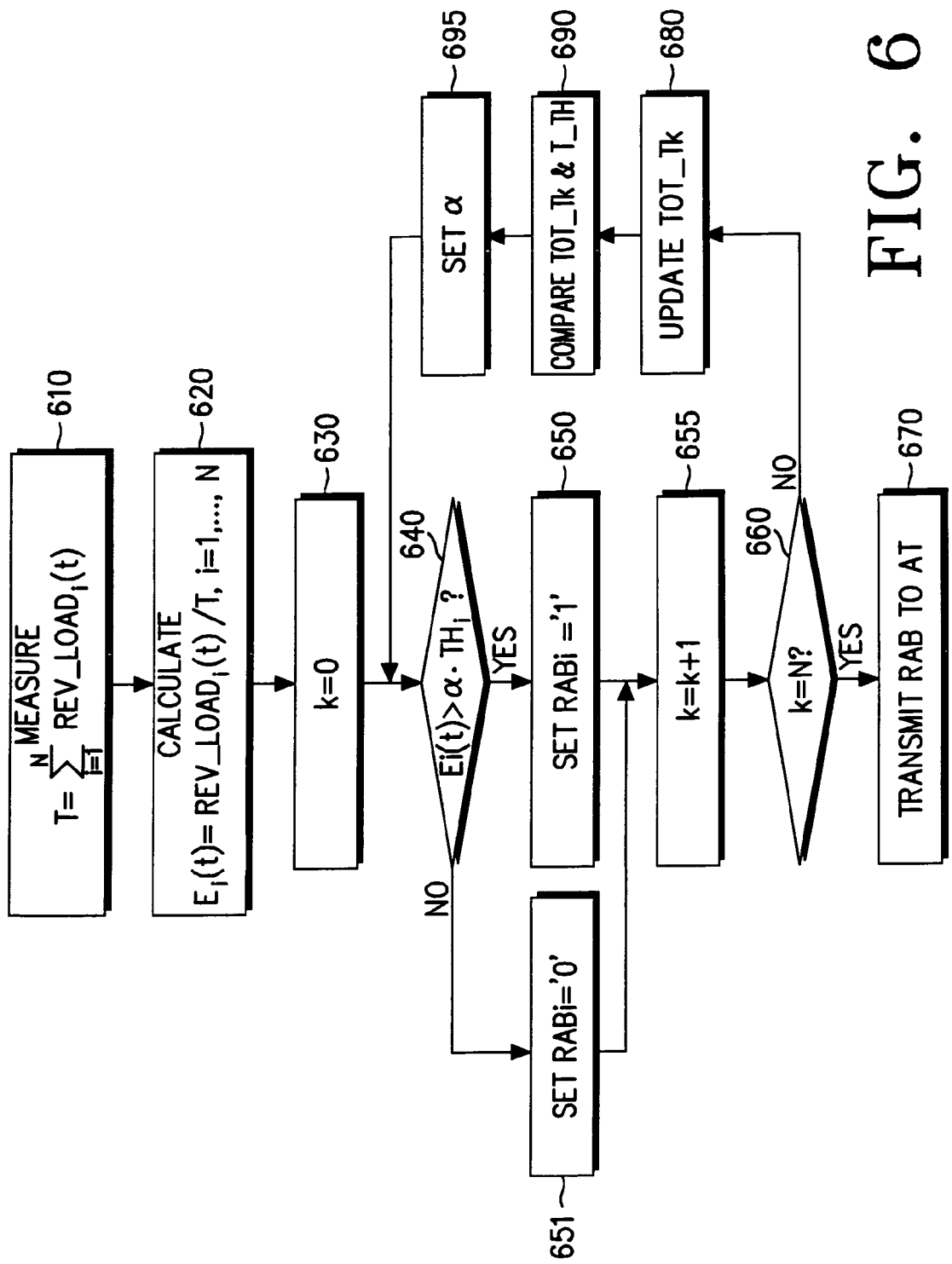
FIG. 6 is a flowchart illustrating an operation of determining RABs for individual ATs according to the embodiment of the present invention.

FIG. 6 is a flowchart illustrating an operation of determining an RAB for each AT to transmit different RABs to different ATs according to the embodiment of the present invention. By this procedure, an AN can control overload. Referring to FIG. 6, the AN measures the total load T on the reverse link by measuring the total energy of the reverse link from the ATs in a sector in step 610. Here, $$T = \sum_{i=1}^{N} \text{REV\_LOAD}_i(t) \cdot \text{REV\_LOAD}_i(t)$$

is a parameter indicating the load imposed on the reverse link by an ith AT. The AN can determine the reverse load REV_LOAD proportionally by calculating the reception energy of a signal from each AT. The reception energy includes energy related with the volume of received data and interference from adjacent cells, and thermal noise energy.

$$\text{REV\_LOAD}_i(t) = \int_{t-D}^{t} [r_i(\tau)]^2 \, d\tau = \int_{t-D}^{t} [r(\tau)pn_i(\tau)]^2 \, d\tau \qquad (1)$$

where D is a measuring time period, $r_i$ is a signal received from the ith AT, r is signals received from ATs, and $pn_i$ is the PN code of the ith AT.

In step 620, the AN calculates the share of each AT in the total reverse load. The share of each AT is calculated by comparing the total reverse load with the load of each AT measured for a predetermined time in $E_i(t)=\text{REV\_LOAD}_i(t)/T$. A variable indicating the number k of ATs is set to an initial value, 0 in step 630.

In step 640, a predetermined value $\alpha \times TH_i$ is compared with the load measurement $E_i$ in order to determine an RAB for each AT. The variable $\alpha$ can be varied according to the comparison result between the total reverse link capacity and the measured reverse link capacity during the RAB determination procedure for each AT. $\alpha$ is less than 1 and can be initially determined considering the number N of the ATs in the cell. For example, if N is less than a predetermined threshold N_TH, $\alpha$ can be set to a small value in order to increase the number of ATs, which can increase their data rates. On the contrary, if N is greater than N_TH, $\alpha$ can be set to a large value in order to reduce the number of ATs, which can increase their data rates.

The threshold $TH_i$ can be set to a different value for each AT according to a service connected to the AT and the class of the AT. Or the threshold $TH_i$ can be identical for all ATs. If the load of the AT is greater than the predetermined value in step 640, the procedure goes to step 650, and otherwise, the procedure goes to step 651. In step 650, an RAB for the AT is set to 1 and in step 651, it is set to 0. If the RAB is 1, the AT is supposed to reduce its data rate, for example, by half. If the RAB is 0, the AT is supposed to increase the reverse data rate, for example, by two fold. The RAB determination in steps 640 and 650 or 651 is performed until it is checked whether RABs are determined for all the ATs in step 660. In step 655, k is increased by 1. It is determined whether k is equal to N in step 660. If they are equal, that is, RABs are determined for all the ATs, the RABs are transmitted to the ATs in step 670.

Meanwhile, steps 680, 690, and 695 are performed before an RAB is determined for another AT. In step 680, the reverse capacity TOT_Tk is updated. The total receivable reverse capacity T_TH of the AN is compared with the updated reverse capacity TOT_Tk in step 690, and the variable $\alpha$ (<1) is adjusted according to the comparison result in step 695. For example, as the updated reverse capacity approaches to the total reverse capacity, the variable $\alpha$ is adjusted to be less, to thereby increase the number of ATs that can increase their data rates.

The above RAB determination procedure is performed for all ATs within a cell and in the following order according to the embodiment of the present invention.

(1) An AN determines ATs requesting a predetermined data rate;

(2) The AN checks the service priorities of the ATs;

(3) The AN determines RABs for the ATs in a descending order of the service priorities;

(4) If there are ATs that have the same priority, the AN determines an RAB first for an AT with a lower data rate; and (5) The AN gives a lower priority to an AT having a high priority for more than a predetermined number times to maintain service equity between ATs.

If services are completely provided to the ATs requesting the predetermined data rate, RABs are determined for ATs with lower current data rates and higher priorities among ATs in services to which time delay is not so important. A lower priority is given to an AT having a high priority for more than a predetermined number times in the next data rate determination procedure.

As described above, the present invention provides a method and an apparatus for transmitting an RAB to an individual AT on a forward MAC channel and a modified forward transmission slot, for control of reverse data rate. While the existing HDR system has limitations in effective overload control due to indiscriminate reverse data rate control for all ATs, an individual AT-based reverse data rate is performed in the present invention, thereby achieving efficient overload control and preventing drastic data rate changes in ATs. Furthermore, the AT-based data rate control of the present invention is more acceptable for supporting services of diverse characteristics or controlling data transmission according to user classes.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of controlling reverse data rates in a mobile communication system having an Access Network (AN) and a plurality of Access Terminals (ATs) in one cell, comprising the steps of:

determining, in the AN, rate control information according to a reverse link load for each of the plurality of ATs; and sending, from the AN, the determined rate control information to each of the plurality of ATs, wherein the determined rate control information includes a Reverse Activity Bit (RAB) that is multiplied by different Walsh codes according to Medium Access Control (MAC) indexes of each of the plurality of ATs.

2. A method of controlling reverse data rates in a mobile communication system having an Access Network (AN) and a plurality of Access Terminals (Ats) in one cell, comprising the steps of:

receiving, in each of the plurality of ATs, rate control information that is determined by a reverse link load of each of the plurality of ATs; and transmitting, in each of the plurality of ATs, packet data with a data rate corresponding to the received rate control information, wherein the determined rate control information includes a Reverse Activity Bit (RAB) that is multiplied by different Walsh codes according to Medium Access Control (MAC) indexes of each of the plurality of ATs.

3. A method of controlling reverse data rates in a mobile communication system having an Access Network (AN) and a plurality of Access Terminals (Ats) in one cell, comprising the steps of:

calculating a load share of each of the plurality of ATs in a total reverse link load;

determining a reverse data rate of each of the plurality of ATs according to the calculated load share of each of the plurality of ATs; and transmitting individually the determined reverse data rates to each of the plurality of ATs, wherein the load share is calculated using a Reverse Activity Bit (RAB) that is multiplied by different Walsh codes according to Medium Access Control (MAC) indexes of each of the plurality of ATs.

* * * * *

UNITED STATES PATENT AND TRADEMARK OFFICE
CERTIFICATE OF CORRECTION

PATENT NO. : 7,580,366 B2  Page 1 of 1
APPLICATION NO. : 11/366876
DATED : August 25, 2009
INVENTOR(S) : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 604 days.

Signed and Sealed this

Fourteenth Day of September, 2010

David J. Kappos
*Director of the United States Patent and Trademark Office*